Patented Aug. 8, 1944

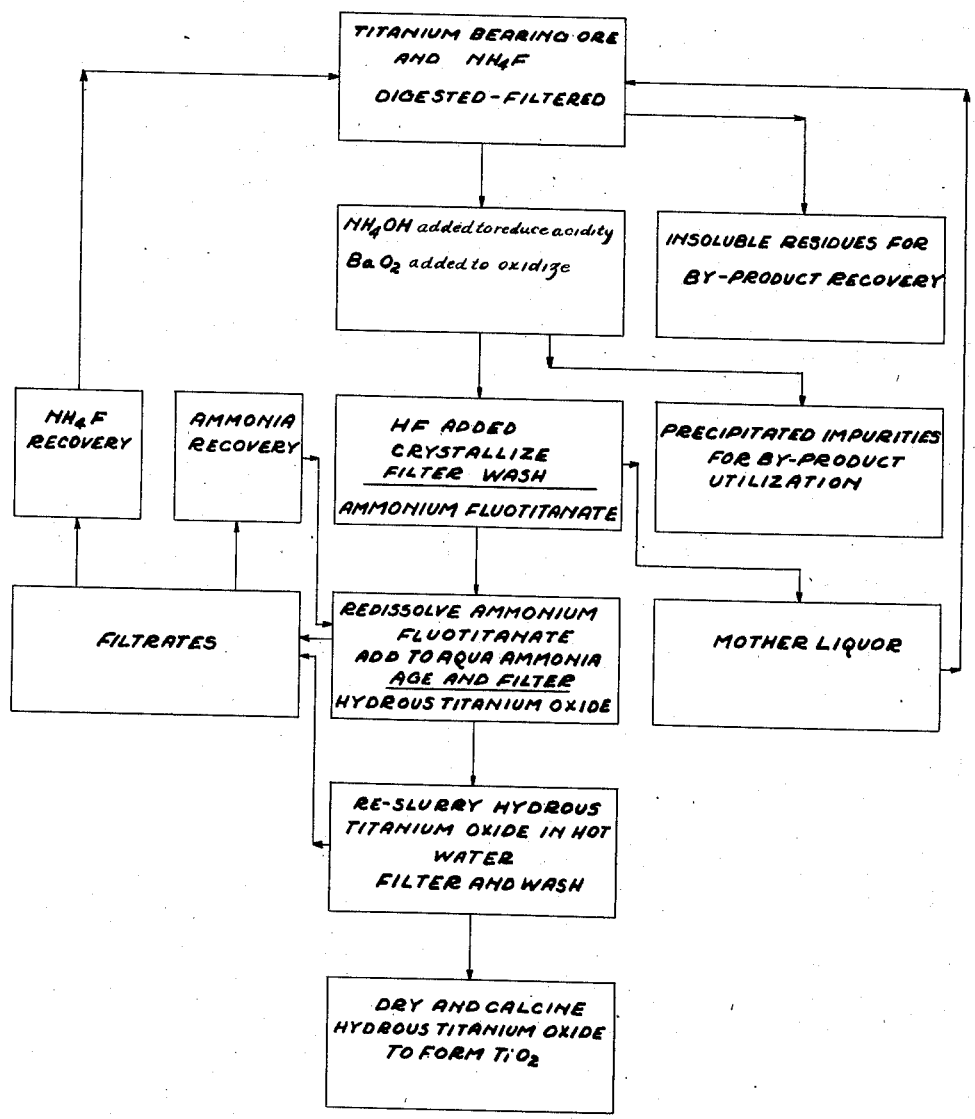

2,355,187

UNITED STATES PATENT OFFICE 2,355,187

PROCESS OF MANUFACTURING TITANIUM PIGMENT

Seldon P. Todd, Gloucester City, and Fredric C. Verduin, Audubon, N. J., assignors to The Sherwin-Williams Company, Cleveland, Ohio, a corporation of Ohio Application March 2, 1940, Serial No. 321,974

10 Claims. (Cl. 23—202)

The invention to which the following description relates consists of titanium pigment of characteristic rutile structure and the process by which it may be made efficiently in relatively pure form.

Pigmentary titanium dioxides, as heretofore commercially manufactured, have been of the anatase structure. The object of the present invention is to produce a pigmentary rutile.

We distinguish pigmentary from non-pigmentary rutile as possessing a tinting strength and hiding power markedly higher than that of commercially available pigmentary anatase and in line with its increased index of refraction. It also possesses a degree of brightness and whiteness equivalent to that of commercially available pigmentary anatase, as well as the usual characteristics of an acceptable commercial titanium pigment, such as softness and smoothness of texture, particle size similar to pigmentary anatase, fineness, easy miscibility and grinding with the customary liquids and vehicles, satisfactory dispersion in such liquids, rubber plastics, resins and water, low oil absorption, resistance to weathering and general suitability for usage as a pigment.

Thermally hydrolyzed titania hydrates, such as those produced by the sulphate process, may be converted to rutile by calcination at high temperatures and the addition of sintering agents but the product is non-pigmentary as shown by definitely low hiding power and tinting strength, as compared to pigmentary anatase, and by poor color. Sample #1 mentioned in the table below is a representative commercial sample of this type. Chemically precipitated hydrates, obtained by contacting titanium solutions, other than fluoride, with ammonia or other alkali, dry to hard, horny masses which cannot be calcined to pigmentary materials.

In the evaluation of tinting strength we refer to the method described under Designation: D332–16, pages 656–659, A. S. T. M. Standards 1939, part II. In the evaluation for hiding power we refer to the same source, pages 642–645, Designation D406–39. Anatase has an established refractive index of 2.51 and rutile has an established index of 2.71. These values for anatase and rutile are the average of determinations made for the various orientations of the crystal, using yellow (Na) light according to Teubert Zeits für Krist 44 (1907) page 313, and Bärwald Zeits für Krist 7 (1883) page 168. Particle size and distribution being equal, tinting strength and hiding power increase with the increase in the refractive index of the pigment. Our pigmentary rutile on account of possessing about the same particle size and distribution as the best available pigmentary anatase shows, accordingly, an increased tinting strength and hiding power, as would be expected, in comparison with such anatase. Non-pigmentary rutile because of its relatively large particle size and poor distribution has lower tinting strength and hiding power than anatase. The maximum hiding power is attained in a pigment as a result of possessing the optimum range of particle size and distribution with a given refractive index and non-pigmentary rutile does not possess this optimum range of particle size and distribution.

The following table will demonstrate the properties discussed herein. A commercially available anatase product rated and determined by comparison with other similar anatase products to possess highest available tinting strength was arbitrarily assigned a T. S. of 1250. This is represented by sample #2 below. The hiding power of this pigment is taken as 100%. Sample #3 mentioned below, was produced by the method of Example A hereinafter described.

| | T. S. | H. P. |
|---|---|---|
| | | Per cent |
| #1—Non-pigmentary rutile | 1,000 | 89 |
| #2—Commercial high grade anatase | 1,250 | 100 |
| #3—Pigmentary rutile | 1,480 | 128 |

Calcination temperatures ranging from 800–1200° C. are reported in the literature as showing the range of operation for the sulphate processes. A temperature in the vicinity of 950° C. is customarily employed. Lower temperatures within the range do not develop satisfactorily the full tinting strength and color, and the higher temperatures tend to sinter the pigment. The product is anatase. By addition of a sintering agent and use of temperature in the range of 1000°, rutile structure may be obtained with lowered hiding power and poorer color.

In the fluoride processes of the prior art, temperatures of 975–1000° C. are customarily employed when the hydrate has been produced by contacting titanium fluoride liquors containing an excess of ammonium fluoride with aqua ammonia. Under these conditions a pigmentary titanium oxide is obtained, but the crystalline structure is largely anatase. An increasing proportion of rutile may be obtained as the temperature of calcination is raised above 1000° C. but a corresponding sacrifice of pigmentary properties is also manifested. As the amount of fluorine present with the titanium in the complex titanium-ammonium-fluoride solutions, as contacted with ammonia, is reduced the ability to obtain rutile structure from the precipitated hydrates at progressively lower temperatures is effected, until, at a mol ratio of fluorine to titanium in the vicinity of 6:1, rutile structure with full development of tinting strength, color, and texture results with temperatures of 900–925° C., and rutile structure with quite satisfactory tinting strength, equal or surpassing that of anatase, may be obtained with temperatures as low as 800° C.

It is to be understood that in this discussion of calcination temperatures, time is also a factor. Thus, it is possible to effect practically equivalent final results by calcining at a slightly lower temperature for a longer period of time or, as the converse, by higher temperature at somewhat shorter time. The specific temperatures cited are to be considered as referring to approximately equal time periods of calcination. In this case we refer more particularly to average time of calcination of 2–4 hours which is a usual operation procedure. For this reason we do not wish to be confined to the narrow range of temperatures cited, since, by variation of the time of calcination, temperatures as low as 800° C. or as high as 1200° C. may be employed.

In the prior processes of making titanium oxide pigments from complex titanium-ammonium-fluoride compounds it has been deemed necessary to use an excess of fluorine as ammonium fluoride, over that required to combine with the titanium, for the purpose of effecting more complete conversion of the titanium; then to purify the solutions from metallic contaminants and to precipitate hydrous titanium dioxide from the resulting purified solutions directly by contacting with ammonia. Calcination of this hydrous titanium dioxide results in conversion to pigmentary titanium dioxide wholly or largely of the anatase structure. We have discovered that the resulting hydrous titanium oxide acquires distinctive and desirable characteristics in a fluoride process as the ratio of fluorine to titanium in the titanium-ammonium-fluoride solutions from which the hydrous titanium oxide is precipitated is reduced below those ratios that have been employed in the process as heretofore practiced.

The optimum relation between fluorine and titanium appears to be that found in the compound ammonium fluotitanate $(NH_4)_2TiF_6$. As the F/Ti ratios in the liquors used for precipitation are reduced from the higher ratios of 10/1 or 12/1, or even higher, of prior practices and approach the 6/1 mol ratio of this compound, the hydrates produced exhibit the capability of being calcined to pigmentary titanium dioxide of rutile structure at progressively lower temperatures. By use of an ammonium fluotitanate solution having a F/Ti ratio of 6/1 we obtain not only a practical working solution, but one from which it is possible to reliably produce a distinctive hydrous titanium oxide which may be conveniently and satisfactorily converted to superior pigmentary titanium dioxide of rutile structure at relatively low temperatures, said pigmentary rutile possessing exceptionally high tinting strength and other superior pigmentary properties.

Our hydrous titanium oxide is distinctive in that it does not belong either to the class of hydrates obtained by thermal hydrolysis or to the class comprising other alkali-precipitated hydrates. When examined by X-ray diffraction methods our hydrous titanium dioxide discloses patterns characteristic of poorly organized, semicrystalline structure (band structure) in contrast to the line patterns characteristic of thermally hydrolyzed titania hydrates on the one hand and to the complete absence of patterns characteristic of the other alkali-precipitated hydrates on the other hand. The band pattern produced by our hydrates shows as a slightly displaced rutile structure, indicating isomorphism, that is, a larger unit cell of axial ratio close to that of rutile.

It is this ability to effect complete conversion to rutile at lower temperatures and in the absence of fluxing or sintering agents that permits the production of pigmentary as compared to non-pigmentary rutile.

Another of the properties of our hydrate is its ability to dissolve in sulphuric acid of low concentration as, for example, 3 to 10%. This solubility in dilute cold mineral acids, including also nitric, hydrochloric, and hydrofluoric acids, differs in a marked degree from the titania hydrates obtained by thermal hydrolysis. These latter are insoluble in such acids even when the concentration of the acid is 20 to 25% or even higher. This solubility in acids of low concentration is also a property of all chemically precipitated titania hydrates, but fluoride hydrate alone of such chemically precipitated titania hydrates is capable of being calcined to pigmentary titanium dioxide.

A further characteristic of the hydrate thus produced by our novel method is that it possesses an alkaline property as exhibited by its reaction to the usual indicators, since it contains neither free nor combined acids as is the case with the titania hydrate thermally hydrolyzed from acid solution but will, on the contrary, contain small amounts of residual $NH_3$.

By calcination of this hydrate, pigmentary rutile can be obtained in the absence of any sintering, conditioning, or other addition agents, although the use of such agents is not objectionable.

As already pointed out, the process is best performed when the optimum ratio of fluorine to titanium of 6 to 1 as represented by the formula $(NH_4)_2TiF_6$ is present in the solution prior to its precipitation with ammonia. This is a definite and relatively simple compound in contrast to the complex or addition compounds necessarily present when there is an excess of ammonium fluoride resulting or remaining from the reactions of the process as practiced in the prior art.

In our method for carrying out the separation of ammonium fluotitanate by crystallization from the purified titanium-ammonium-fluoride solution the latter is rendered acidic in character. This marked departure from prior practice has been found to contribute to the separation of a substantially pure ammonium fluotitanate corresponding to the formula $(NH_4)_2TiF_6$. At the same time the acid nature of the solution promotes the solubility of the iron and other contaminating metal salts so that there is less tendency of their being carried over with the crystals. For example, in rendering our solution acid preparatory to the crystallization, the addition of hydrofluoric acid in a very minor proportion will serve the desired purpose.

By dissolving the thus obtained ammonium fluotitanate crystals in water a titania solution substantially free from metal contaminants and of the optimum 6 to 1 fluorine to titanium ratio is obtained.

As indicative of the improved nature of the hydrous titanium oxide precipitated from a solution of ammonium fluotitanate, especially when this precipitation is carried on under the conditions specified hereinafter, our product is distinctive in character from any hydrous titanium oxide hitherto prepared commercially, notably in its ability to be converted into a pigmentary rutile possessing the optimum properties of whiteness, brightness, hiding power, wettability, low oil absorption, and the texture essential for a superior commercial pigment.

In order that the nature of our product shall be better understood and its manufacture may be followed, we will describe the preferred process, as illustrated in the accompanying flowsheet drawing.

We may take as materials for our process any of the natural titanium-bearing materials or ores such as rutile, ilmenite, nelsonite, and titaniferous iron ores. We may also use similar titanium-bearing ores and artificially prepared materials such as impure titanium oxide or titania hydrate.

The presence of iron, chromium, vanadium, manganese, phosphates, and the like in the titanium-bearing material used does not adversely affect the process, since these are to a large extent removed as insoluble impurities by the filtration step following digestion, although we prefer using material of low silica content.

The first operation is the digestion of the ore with ammonium fluoride. Throughout this specification and in the claims it will be understood that the term "ammonium fluoride" is used in the generic sense and includes the bi-fluoride. The digestion may be accomplished according to the method described and claimed in the copending companion application of Perry E. Mayer, filed November 13, 1939, Serial No. 304,144, now Patent No. 2,288,727, issued July 7, 1942. However, any reasonably satisfactory equivalent process of digestion may also be utilized as, for example, that disclosed in the U. S. Patent #2,042,435, to Svendsen, in order to prepare the material for the novel steps of our process.

Considerable latitude in the ratio of fluorine to the ore may be practiced, the presence of some excess of $NH_4F$ being desirable at this point for the purpose of effecting complete conversion of the titanium to the soluble form.

The insoluble residues are separated from the digestion product by filtration.

The normal crude titania-bearing liquor thus produced consists of a solution of ammonium fluotitanate carrying excess ammonium fluoride and a small amount of impurities such as metallic fluorides. This solution is acidic in nature and the first step in its treatment is to substantially neutralize it with ammonia or other alkali whereby the impurities are largely precipitated, after which the solution is filtered hot, to remove the precipitated impurities.

Still further purification of the solution may be effected by an additional oxidation treatment. The filtrate may be oxidized by adding finely pulverized barium peroxide, and the resulting precipitate filtered out. This has the purpose of insuring complete oxidation of the iron to the ferric state, but care is taken not to provide an excess of the oxidant which will form pertitanates. In place of barium peroxide we may use electrolysis, another peroxide, perborate, persulphate, or the like, such as $H_2O_2$, $Na_2O_2$, $(NH_4)_2S_2O_8$, bromine, chlorine, and other suitable oxidants.

It is usually only necessary to add sufficient oxidant to insure the transformation of all iron to the ferric state. Normally the solution contains 0.05% or less of iron expressed as $Fe_2O_3$. Part of this is already in the ferric state. Therefore, only a small amount of oxidation is required. The oxidation step may be combined with the neutralization, if desired.

Under certain conditions the slurry after digestion will contain a sufficiently low content of soluble metallic salts as impurities so that the step of neutralization may be omitted and the liquor, after removal of insoluble substances, may then be directly acidified and a satisfactory ammonium fluotitanate crystallized therefrom.

While the objects in the above steps have been the removal of impurities in solid form, from this point on it is our object to prevent precipitation of the remaining impurities and to insure their retention in the solutions from which the desired titanates are being separated by crystallization as hereinafter described. Maintenance of a slightly reducing condition during these later steps has been found in certain cases to materially aid in causing such trace of impurities as remains, as, for example, iron, to be more soluble. Ferrous iron is more soluble than ferric.

The clear hot liquor is acidified with hydrofluoric acid. This also increases the solubility of the trace of impurities that may still be present. The amount of HF added is not critical but there must be sufficient to keep the iron in solution during the following crystallization step. Hydrochloric or other suitable acids may be substituted and wide variation in the concentration is permissible, care being taken, however, to avoid undue dilution of the titania liquor, as this would reduce the crystal yield. The hydrofluoric acid has the advantage that it will not complicate the recovery of fluorine in a cyclic process as would be the case if other acids were used.

The next step is that of crystallizing the ammonium fluotitanate. The acidified solution is cooled, for example, to 20° C. While this temperature is suggested, it will be noted that any suitable temperature may be substituted, but unduly low temperatures may tend to induce the crystallization of such iron salts as may be present. Crystals of substantially pure ammonium fluotitanate form and are filtered from the relatively cool mother liquor, the excess ammonium fluoride as well as substantially all of the other soluble salts and metallic impurities remaining in the liquor. The crystals are washed with water, dilute hydrofluoric acid, or with the liquor from a subsequent recrystallization step, should such recrystallization be employed, to effect a still higher degree of freedom from impurities.

While the principal object of our improved process is to produce titanium dioxide having pigmentary rutile structure, our method of producing substantially pure ammonium fluotitanate is a highly useful improvement in the art which may be employed in processes in which ammonium fluotitanate is used as a base material in the production of other titanium compounds.

The crystals are then dissolved in water to form a solution of ammonium fluotitanate. The concentration is not critical and may be varied up to saturation. Preferably the solution at a temperature of approximately 40° C. is fed gradually, with agitation, into a tank containing a predetermined quantity of aqua ammonia to form hydrous titanium oxide as a precipitate. It is desirable that sufficient of the aqua ammonia be used to give a stoichiometric excess of $NH_4OH$ to the titanium dioxide present. The concentration of ammonia may be varied within any practical limits, although our preference of range is 15–25%. Excess of ammonia over theoretical is required to prevent formation of undesirable crystal complexes. A ratio of 20 parts by weight of 20% aqua ammonia to one part of $TiO_2$ represents a safe lower limit, although under certain conditions still lower ratios may be used. A ratio of 50 parts by weight of 20% aqua ammonia to one part $TiO_2$ is probably a practical upper limit, although again higher ratios are not inherently objectionable. This addition or mixture normally requires about forty minutes.

When all of the hydrous titanium oxide has been thus precipitated it is aged, filtered from the slurry, and washed with hot water to substantially free it from contaminating salts.

In the washing operation the wash water may contain formaldehyde or other reducing agent to maintain the desired reduced condition of the material. Formaldehyde or other reducing agent may be added to the liquors, both the aqua ammonia and the ammonium fluotitanate solution, prior to precipitation, and the reduced state thereby maintained throughout precipitation and succeeding steps.

It has been found that reslurrying of the filter cake and heating at this point is a decided advantage. It may, therefore, be taken up in water using from an equal quantity to five times the weight of the cake. The operation may consist in boiling the slurry for from fifteen minutes to several hours.

Final filtering of the hydrous titanium oxide produces a cake which may then be dried to remove moisture and such residual ammonia as may be present. This drying may be carried out at from 20° C. to as high as 500° C. While this preliminary drying is not necessary, it helps to remove volatiles and to reduce the burden upon the calciner.

The hydrous titanium oxide as thus produced may be used as a base material for the manufacture of titanium compounds other than titanium dioxide and therefore the steps of our improved process by which we produce this hydrous titanium dioxide constitute a novel and highly useful improvement in the art which is independent of the final calcination step for producing titanium dioxide.

Calcination of the dried hydrous titanium oxide at from two to four hours at 800–1200° C. develops a definite rutile crystal structure of the desired particle size and quality to give improved pigmentary properties. Somewhat higher calcination temperatures for shorter periods of time may be employed without loss of pigmentary characteristics as for the purpose of producing pigment of low oil absorption.

Example A

As a more specific example of our preferred practice a quantity of 100 kilos of finely ground ilmenite ore is mixed with 400 kilos of a 30% aqueous solution of ammonium fluoride. This mixture is then introduced into a closed reaction vessel provided with a stirrer and the mass is heated with stirring. The temperature is maintained at 160–180° C. until the digestion is complete, the time required being about ten hours. The ammonia and water vapor formed are vented from the vessel. Addition of new water is made necessary to maintain the mass in a fluid condition. The slurry produced is then filtered and the filtrate treated with sufficient ammonia to bring to substantial neutrality. The precipitated impurities are removed by filtration. The solution is now acidified by the addition of eight (8) kilos of 80% hydrofluoric acid and cooled to 20° C. in a suitable type of crystallizer. The crystals of ammonium fluotitanate are then separated from the mother liquor and washed with water. The mother liquor and washings are returned into the process for recovery of the values. The yield of crystals is approximately 75 kilos.

The 75 kilos of the ammonium fluotitanate crystals are dissolved in water to make 600 kilos of solution containing 5% $TiO_2$. This solution is adjusted to 40° C. and fed gradually with agitation into 900 kilos of 20% aqua ammonia during a period of 40 minutes, after which the mixture is aged an additional twenty minutes, the precipitate filtered from the slurry, and washed with hot water to substantially free it from ammonia and salts.

The cake is reslurried with 5 times its weight of water and the slurry boiled for an hour. The batch is again filtered to separate the excess water and the hydrous titanium oxide dried and calcined for a period of three hours at a temperature of 950–975° C.

Example B

As another specific example wherein the effects of oxidation and reduction in successive stages are employed, the slurry obtained from digestion as described in the previous example is filtered, and the filtrate treated with 0.17 kilo of $(NH_4)_2S_2O_8$ to oxidize the iron present. Sufficient ammonia is added to bring to substantial neutrality. The precipitated impurities are removed by filtration. The solution is then reduced with 0.05 kilo of metallic zinc and is acidified by the addition of 8 kilos of 80% hydrofluoric acid and cooled to 20° C. in a suitable type of crystallizer. The crystals of ammonium fluotitanate are then separated from the mother liquor and washed with water. The mother liquor and washings are returned into the process for recovery of the values. The yield of crystals is approximately 75 kilos.

The 75 kilos of the ammonium fluotitanate crystals are dissolved in water to make 600 kilos of solution containing 5% of $TiO_2$. This solution is treated with 0.014 kilo of metallic zinc, adjusted to 40° C. and fed gradually with agitation into 1200 kilos of 20% aqua ammonia containing 0.01% formaldehyde during a period of forty minutes, after which the mixture is aged an additional twenty minutes, the precipitate filtered from the slurry and washed with hot water containing 0.01% formaldehyde to substantially free it from ammonia and salts.

The cake is reslurried with five times its weight of water containing 0.01% formaldehyde and the slurry boiled for an hour. The batch is again filtered to separate the excess water and the hydrous titanium oxide dried and calcined for a period of three hours at a temperature of 950–975° C.

The operation of the process as described in detail above has been set forth only for the purpose of illustration and many changes in such factors as time, temperature, concentration, etc.

may be carried out within the scope of this invention.

It will be evident from the flow sheet that the process lends itself to efficient and economical treatment of the several residues, liquors, and solutions. Thus, the insoluble and precipitated residues are treated for recovery of their different values. The ammoniacal liquors after separation from the hydrous titanium oxide are combined with the wash filtrate, stripped from ammonia, and used for the digestion of more titanium ore, thus making a cyclic process. The ammonia recovered is reused in the process.

Having thus described our invention, we claim:

1. In a process of making titanium dioxide the steps which consist of digesting titanium-bearing material with ammonium fluoride and forming a complex titanium-ammonium-fluoride solution carrying metallic compounds as impurities, removing the insoluble impurities, adding acid to increase the acidity of the solution, crystallizing out ammonium fluotitanate, separating the crystals from the liquor and redissolving them in water free from ammonium fluoride, precipitating hydrous titanium oxide by mixture with aqua ammonia, separating the precipitate, washing and calcining.

2. In a process of making titanium dioxide the steps which consist of digesting titanium-bearing material with ammonium fluoride and forming a complex titanium-ammonium-fluoride solution carrying metallic compounds as impurities, adding ammonia to approach neutralization and effect precipitation of soluble impurities, removing the precipitated and insoluble impurities, adding acid to increase the acidity of the solution, crystallizing out ammonium fluotitanate, separating the crystals from the liquor and ammonium fluoride and redissolving them in water, precipitating hydrous titanium oxide by mixture with aqua ammonia, separating the precipitate, washing, and calcining.

3. In a process of making titanium dioxide the steps which consist of digesting titanium-bearing material with ammonium fluoride and forming a complex titanium-ammonium-fluoride solution carrying metallic compounds as impurities, adding ammonia to approach neutralization and effect precipitation of soluble impurities, removing the precipitated and insoluble impurities, adding sufficient hydrofluoric acid to substantially increase the acidity of the solution, crystallizing out ammonium fluotitanate, separating the crystals from the liquor and ammonium fluoride and redissolving them in water, precipitating hydrous titanium oxide by mixture with aqua ammonia, separating the precipitate, washing, and calcining.

4. In the preparation of purified titanium compounds the step of separating ammonium fluotitanate, from a titanium-ammonium-fluoride solution containing excess ammonium fluoride and soluble impurities, by adding sufficient acid to substantially increase the acidity of the solution and then crystallizing the ammonium fluotitanate therefrom.

5. In the preparation of purified titanium compounds the steps of separating ammonium fluotitanate from a titanium-ammonium-fluoride solution containing excess ammonium fluoride and soluble impurities by adding sufficient hydrofluoric acid to substantially increase the acidity of the solution and then crystallizing the ammonium fluotitanate therefrom.

6. In the process of making a titanium compound the steps consisting of dissolving ammonium fluotitanate crystals in water free from ammonium fluoride, then adding the solution thus formed to an excess of aqua ammonia and then separating the precipitated hydrous titanium oxide, while maintaining a reducing condition throughout the steps mentioned.

7. In the process of making titanium dioxide the steps consisting of dissolving ammonium fluotitanate crystals in water free from ammonium fluoride, then adding the solution thus formed to an excess of aqua ammonia, then separating the precipitated hydrous titanium oxide, washing, reslurrying in water, boiling, and separating the hydrous titanium oxide, and wherein a reducing condition is maintained throughout the step of adding the aqua ammonia and the remaining steps mentioned.

8. The steps which consist of adding an aqueous solution of ammonium fluotitanate free from ammonium flouride to an excess of aqua ammonia, separating the precipitated hydrous titanium oxide, washing, and then calcining, all of said steps except that of calcining being carried out while maintaining a reducing condition.

9. The steps which consist of adding an aqueous solution of ammonium fluotitanate free from ammonium fluoride to an excess of aqua ammonia, separating the precipitated hydrous titanium oxide, washing, reslurrying in water, boiling, separating the hydrous titanium oxide, washing and calcining, all of said steps except that of calcining being carried out while maintaining a reducing condition.

10. In the preparation of purified titanium compounds the step of separating substantially iron-free ammonium fluotitanate, from a titanium-ammonium-fluoride solution containing excess ammonium fluoride and soluble impurities, by adding sufficient acid to substantially increase the acidity of the solution and then crystallizing the ammonium fluotitanate therefrom.

SELDON P. TODD.
FREDRIC C. VERDUIN.